United States Patent [19]

Perron

[11] Patent Number: 4,737,917
[45] Date of Patent: Apr. 12, 1988

[54] METHOD AND APPARATUS FOR GENERATING ISOTHERMS IN A FOREHEARTH TEMPERATURE CONTROL SYSTEM

[75] Inventor: Ralf R. Perron, Windsor, Conn.

[73] Assignee: Emhart Industries, Inc., Farmington, Conn.

[21] Appl. No.: 885,979

[22] Filed: Jul. 15, 1986

[51] Int. Cl.$^4$ .................................................. G01K 1/16
[52] U.S. Cl. ................................. 364/473; 364/476; 364/477; 364/557; 374/124; 374/134; 374/137; 374/141; 65/158; 65/162
[58] Field of Search ............... 364/472, 473, 476, 477, 364/557; 374/124, 134, 137, 141; 376/215, 216, 217, 247; 65/158, 160, 162

[56] References Cited

U.S. PATENT DOCUMENTS

| | | | |
|---|---|---|---|
| 4,218,707 | 8/1980 | Reed et al. ........................ | 364/557 |
| 4,301,509 | 11/1981 | Haase et al. ...................... | 364/557 |
| 4,371,483 | 2/1983 | Mattson ............................. | 364/473 |
| 4,403,251 | 9/1983 | Domarenok et al. ............. | 364/473 |
| 4,440,509 | 4/1984 | Agarwal ........................... | 374/137 |
| 4,463,437 | 7/1984 | Schenck et al. .................. | 364/477 |
| 4,501,552 | 2/1985 | Wakamiya ........................ | 364/477 |
| 4,637,910 | 1/1987 | Impink, Jr. ....................... | 376/217 |
| 4,638,436 | 1/1987 | Badger et al. .................... | 364/414 |

Primary Examiner—Jerry Smith
Assistant Examiner—John R. Lastova
Attorney, Agent, or Firm—Arthur B. Moore

[57] ABSTRACT

A technique for generating isotherms representing the cross-sectional temperature profiles of molten glass flowing in a forehearth channel. A plurality of temperature sensors are placed at predetermined locations within the plane of the channel cross-section, advantageously in a rectangular grid, to provide a matrix of temperature readings. Digitalized temperature readings from these sensors are routed to a processor, which interpolates these temperature readings to approximate the temperatures intermediate the various sensing points, and optionally beyond the array of sensing points. The isotherms are obtained by fitting a Lagrangian interpolating polynomial through the various recorded temperatures. The interpolated values thus generated may be used to provide real time displays of isotherms in the forehearth cross-section under examination, or may be included in a control loop.

18 Claims, 6 Drawing Sheets

| DEG. C |
| --- |
| 1250 |
| 1235 |
| 1220 |
| 1205 |
| 1190 |
| 1175 |
| 1160 |
| 1145 |
| 1130 |
| 1115 |

FIG. 4

| DEG. C |
| --- |
| 1138 |
| 1134 |
| 1130 |
| 1126 |
| 1122 |
| 1118 |
| 1114 |
| 1110 |
| 1106 |
| 1102 |

FIG. 5

| DEG. C |
| --- |
| 1136 |
| 1133 |
| 1130 |
| 1127 |
| 1124 |
| 1121 |
| 1118 |
| 1115 |
| 1112 |
| 1109 |

DEG C
- 1249
- 1219
- 1189
- 1159
- 1129
- 1099
- 1069
- 1039

FIG. 10

DEG. F
- 2381
- 2350
- 2320
- 2290
- 2260
- 2230
- 2200
- 2196

FIG. 11

DEG. F
- 2381
- 2350
- 2320
- 2290
- 2260
- 2230
- 2200
- 2196

METHOD AND APPARATUS FOR GENERATING ISOTHERMS IN A FOREHEARTH TEMPERATURE CONTROL SYSTEM

BACKGROUND OF THE INVENTION

The present invention relates to a method and apparatus for generating isotherms in a temperature control system for a glass forehearth, and in particular to a technique for providing to the operator a visual representation of cross-sectional temperature profiles.

The control and display technique of the present invention is designed to be utilized in a forehearth for thermally conditioning molten glass received from a glass melting furnace, to be fed to a glassware forming machine. Such forehearths typically include an elongated refractory channel which is divided into a series of sections or zones, and are designed to bring the glass to a reduced temperature level and to achieve approximate thermal homogeneity. In the present state of the art, the operation of various heating and cooling methods is controlled by a human operator in response to a display of a plurality of temperature measurements taken at strategic locations within the forehearth channel. Inasmuch as thermocouples or other temperature sensor devices are very costly, it is accepted practice to use a limited number of temperature probes to measure temperatures at selected cross-sections along the forehearth channel.

A problem with this type of operator interface is that it is difficult for the operator to effectively visualize the temperature profile at these various cross-sections based upon the limited number of discrete readings taken by the thermocouples. In addition, where the temperature sensor readings may be included in a control loop to provide PID control or the like, the sophistication of the control technique may be limited by the use of only a discrete number of inputs to the control algorithm.

Accordingly, it is a principal object of the invention to provide an improved method and apparatus for generating temperature profiles of molten glass in cross-sections of forehearth channel. A particular object is to provide improved displays to the operator of such temperature profiles. A related object is to facilitate a forehearth operator's ability to visualize such temperature profiles.

SUMMARY OF THE INVENTION

In furthering the above and additional objects the invention provides a processing technique for taking a plurality of experimentally acquired digital temperature value signals for at least one forehearth cross-section, and deriving from such signals interpolated temperature value signals a plurality of interpolated temperature values. The initial digital temperature value signals are obtained from one or more essentially planar arrays of temperature sensors, each preferably forming a rectangular matrix. The processing technique involves defining a grid of location points corresponding to at least a portion of the forehearth cross-section and including location points for each of the sensors. The interpolated temperature values are derived by fitting an interpolating function to the sensor location points and temperature values, such interpolating function defining temperature as a function of grid coordinates. Most preferably, the interpolating function comprises a Lagrangian polynomial. Such grid coordinates may either be two dimensional, based on a planar array of sensors, or three dimensional, based on an arrangement of sensors in a rectangular parallelepiped formation.

The preferred application of this interpolation technique is as a method for displaying the temperature profile at least one cross-section of the forehearth channel. Such display consists of a plurality of isotherms each comprising a set of location points having temperature values at or near prescribed temperature values. Desirably, the display also consists of isotherm bands intermediate such isotherms, such that contiguous isotherm bands are colored or otherwise filled in with visually distinguishable patterns. Illustratively, these bands may be colored with a single hue, or may be multihued to achieve a composite effect.

Typically, the forehearth cross-sections under analysis are transverse to the axis of glass flow. The technique of the invention is equally applicable, however, to top-view cross-sections taken at given heights of the channel, or side-view sections at given distances from a sidewall.

The interpolation technique of the invention may also be used as part of a temperature control process, wherein the isotherms obtained according to this interpolation technique are included in an adaptive control loop to regulate devices for heating and cooling glass in the forehearth channel.

BRIEF DESCRIPTION OF THE DRAWINGS

The above and additional aspects of the invention are illustrated in the following detailed description of the preferred embodiment, which should be taken in conjunction with the drawings in which:

FIGS. 3-6 illustrate various cross-sectional temperature displays provided by the control system of FIG. 2, with legends showing the temperature values at various isotherm bands;

DETAILED DESCRIPTION

Reference should now be had to FIGS. 1-9 for a detailed description of a glass forehearth temperature control and display system in accordance with the preferred embodiment of the invention. The control system 10 (FIG. 2) is illustrated in cooperation with a forehearth 20, such forehearth including a cooling section 33 comprising one or more cooling zones, and an equalizing zone 35. The forehearth includes various sets of temperature probes 21-23, 24-26, and 27-29, each set of probes being associated with given transverse cross-section of the forehearth channel. Each of the temperature probes 21-29 illustratively comprises a triple acting thermocouple, providing three sensing locations at various heights of the forehearth channel.

Figures 2A, 2B:
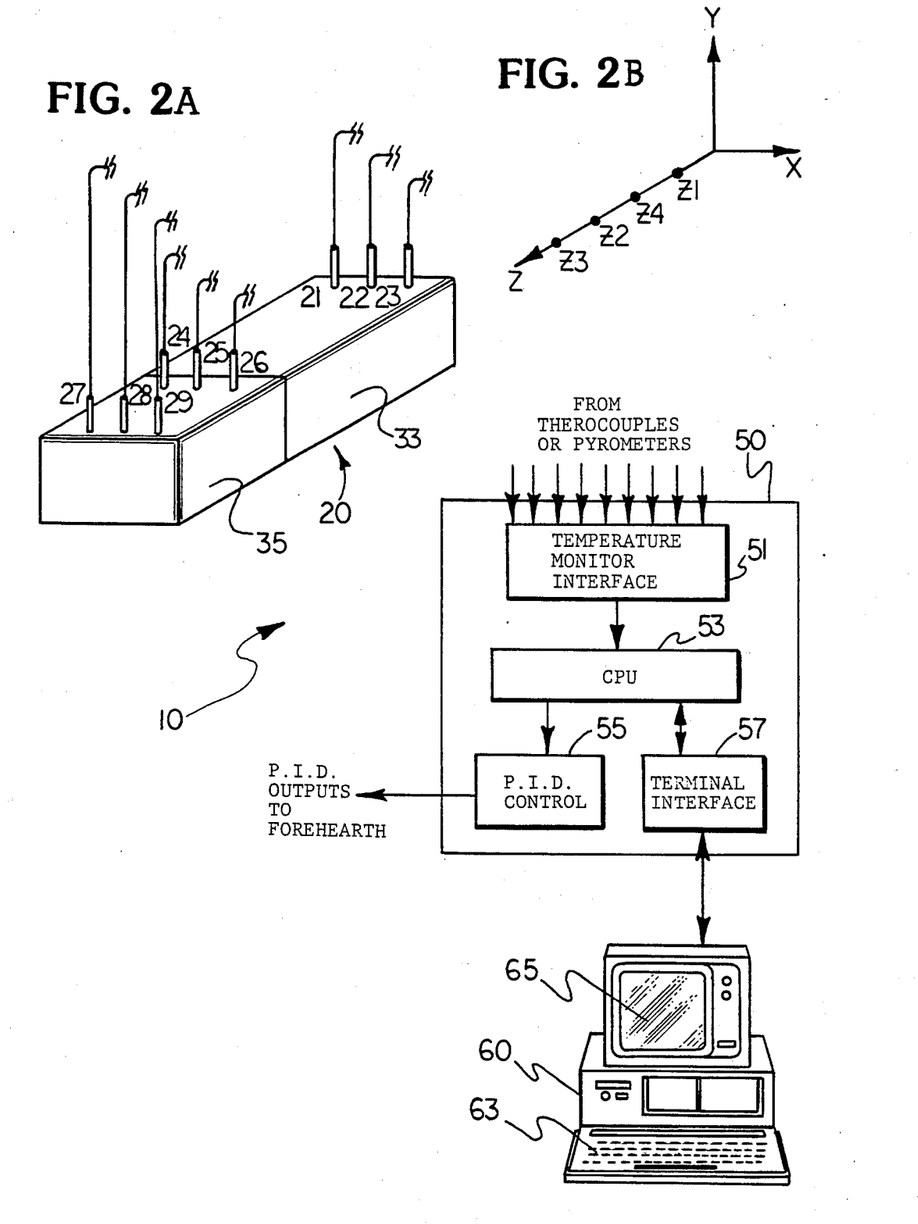
FIG. 2A is a somewhat schematic diagram of a glass forehearth together with a block schematic diagram of the forehearth control system.
FIG. 2B is a schematic diagram of the rectangular axes of the forehearth of FIG. 2A.

Each transverse array of thermocouples provides nine analog signals each representing the temperatures sensed at a given point of the forehearth. Such analog signals are received by temperature monitor interface 51 which digitalizes these signals for input to CPU 53. As discussed in detail below, CPU 53 processes each array of temperature signals corresponding to a given forehearth cross-section, to derive interpolated temperature values. The interpolated temperature value data may be provided to terminal interface 57 in order to display temperature profiles of forehearth cross-sections on monitor 60, as further described herein. Such interpolated data may also be processed by PID control 55 to provide control outputs to electronically controlled heating and cooling devices for forehearth 20.

The discussion which follows predominantly deals with a two-dimensional interpolating technique, for processing the outputs of a planar array of temperature sensors to obtain a two-dimensional set of interpolated temperature values. More broadly, the invention encompasses three-dimensional interpolations, which process signals from a plurality of parallel planar arrays of temperature sensors to obtain interpolated temperature values both within and between the sensor planes. Such three-dimensional interpolation is addressed in more detail after the discussion of the two-dimensional technique.

Figures 1, 3:
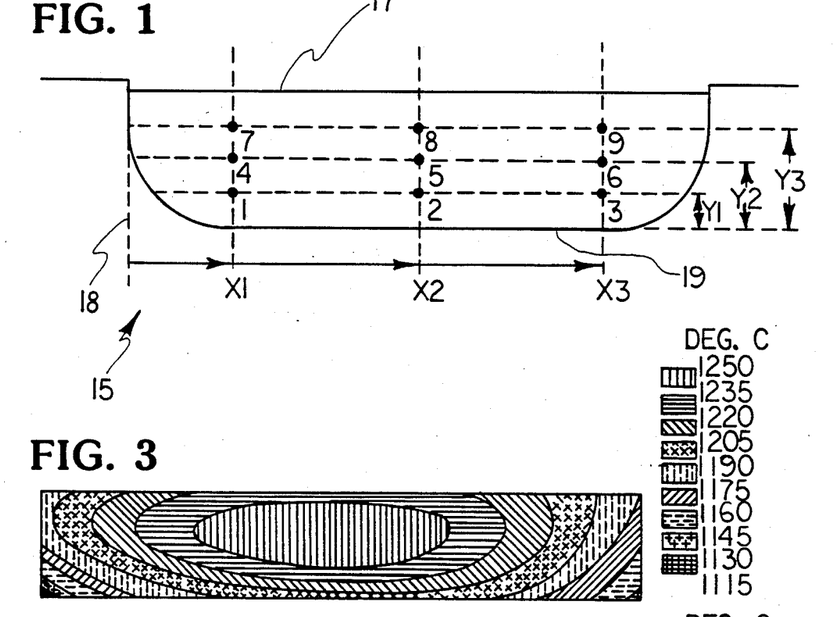
FIG. 1 is a cross-sectional schematic diagram of a forehearth channel, with a $3 \times 3$ array of temperature sensor locations.
FIG. 3 is a display of a cross-section at the forehearth entrance, generated using the routine of FIGS. 7-8.

FIG. 1 schematically illustrates a cross-section 15 of the forehearth channel with molten glass 17. A 3×3 matrix of temperature sensing points is indicated by reference numerals 1-9; each vertical array (for example, points 1, 4, and 7) corresponds to three sensing elements within a tri-level thermocouple (not shown in this figure). A given point in forehearth cross-section 15 is algebraically indicated by the horizontal distance x from the left channel wall 18, and by the vertical distance y from the channel floor 19. The nine sensing locations have predetermined coordinates according to this scheme; e.g., point 1 has coordinates $(x_1, y_1)$. In the preferred embodiment these nine points form a rectangular matrix. This two-dimensional coordinate system, which maps the coordinates for a given longitudinal cross-section of the forehearth at a certain point in time, will be assumed in the algebraic analysis given below.

The technique of the present invention mathematically models temperature as a distributed parameter across one or more cross-sections of the forehearth, in order to derive a temperature distribution (i.e., pattern of isotherms) based upon a limited number of experimentally obtained temperature readings. This model ignores any boundary conditions of the glass temperature, and calculates temperatures at a plurality of x-y grid points by means of a Lagrangian interpolating polynomial between the known temperatures at certain grid points. In accordance with physical theory and empirical observations, this technique fairly accurately approximates the temperature distribution by fitting a polynomial function of the x-y grid points. Lagrangian polynomials are particularly advantageous for deriving a field variable (in this case temperature) as a function of two variables, i.e., $T=f(x,y)$, or possibly as discussed below, a function of three variables $T=F(x,y,z)$.

The following equation gives a Lagrangian polynomial representing $T(x,y)$, i.e., an equation in two variables specifying the interpolated temperature for each grid point. This equation is derived from standard mathematical formulas:

$$T(x, y) = \gamma_1 x^2 y^2 + \gamma_2 x^2 y + \quad \text{EQUATION I}$$
$$\gamma_3 x^2 + \gamma_4 xy^2 + \gamma_5 xy + \gamma_6 x + \gamma_7 y^2 + \gamma_8 y + \gamma_9$$

In the above equation, the coefficients $\gamma_1, \gamma_2$, etc. are specified by various equations based upon the temperatures $T_1$-$T_9$ measured respectively at sensor locations 1-9 (FIG. 1), as well as upon the X-Y coordinates $x_1, x_2, x_3, y_1, y_2, y_3$ of these various sensor locations. These equations are given below:

EQUATIONS II $$\gamma_1 = \frac{1}{a}\left[\frac{T_1}{d} + \frac{T_4}{e} + \frac{T_7}{f}\right] + \frac{1}{b}\left[\frac{T_2}{d} + \frac{T_5}{e} + \frac{T_8}{f}\right] + \frac{1}{c}\left[\frac{T_3}{d} + \frac{T_6}{e} + \frac{T_9}{f}\right]$$

$$\gamma_2 = \frac{-1}{a}\left[\frac{T_1}{d}(y_2+y_3) \frac{T_4}{e}(y_1+y_3) \frac{T_7}{f}(y_1+y_2)\right] - \frac{1}{b}\left[\frac{T_2}{d}(y_2+y_3) + \frac{T_5}{e}(y_1+y_3) + \frac{T_8}{f}(y_1+y_2)\right] -$$

$$\frac{1}{c}\left[\frac{T_3}{d}(y_2+y_3) + \frac{T_6}{e}(y_1+y_3) + \frac{T_9}{f}(y_1+y_2)\right]$$

$$\gamma_3 = \frac{1}{a}\left[\frac{T_1}{d}y_2y_3 + \frac{T_4}{e}y_2y_3 + \frac{T_7}{f}y_1y_2\right] + \frac{1}{b}\left[\frac{T_2}{d}y_2y_3 + \frac{T_5}{e}y_1y_3 + \frac{T_8}{f}y_1y_2\right] +$$

-continued $$\frac{1}{c}\left[\frac{T_3}{d}y_2y_3 + \frac{T_6}{e}y_1y_3 + \frac{T_9}{f}y_1y_2\right]$$

$$\gamma_4 = \frac{-(x_2 + x_3)}{a}\left[\frac{T_1}{d} + \frac{T_4}{e} + \frac{T_7}{f}\right] - \frac{(x_1 + x_3)}{b}\left[\frac{T_2}{d} + \frac{T_5}{e} + \frac{T_8}{f}\right] - \frac{(x_1 + x_2)}{c}\left[\frac{T_3}{d} + \frac{T_6}{e} + \frac{T_9}{f}\right]$$

$$\gamma_5 = \frac{+(x_2 + x_3)}{a}\left[\frac{T_1}{d}(y_2 + y_3) + \frac{T_4}{e}(y_1 + y_3) + \frac{T_7}{f}(y_1 + y_2)\right] + \frac{(x_1 + x_3)}{b}\left[\frac{T_2}{d}(y_2 + y_3) + \frac{T_5}{e}(y_1 + y_3) + \right.$$

$$\left. \frac{T_8}{f}(y_1 + y_2)\right] + \frac{(x_1 + x_2)}{c}\left[\frac{T_3}{d}(y_2 + y_3) + \frac{T_6}{e}(y_1 + y_3) + \frac{T_9}{f}(y_1 + y_2)\right]$$

$$\gamma_6 = \frac{-(x_2 + x_3)}{a}\left[\frac{T_1}{d}(y_2y_3) + \frac{T_4}{e}(y_1y_3) + \frac{T_7}{f}(y_1y_2)\right] - \frac{(x_1 + x_3)}{b}\left[\frac{T_2}{d}(y_2y_3) + \frac{T_5}{e}(y_1y_3) + \right.$$

$$\left. \frac{T_8}{f}(y_1y_2)\right] - \frac{(x_1 + x_2)}{c}\left[\frac{T_3}{d}(y_2y_3) + \frac{T_6}{e}(y_1y_3) + \frac{T_9}{f}(y_1y_2)\right]$$

$$\gamma_7 = \frac{(x_2x_3)}{a}\left[\frac{T_1}{d} + \frac{T_4}{e} + \frac{T_7}{f}\right] + \frac{(x_1x_3)}{b}\left[\frac{T_2}{d} + \frac{T_5}{e} + \frac{T_8}{f}\right] + \frac{(x_1x_2)}{c}\left[\frac{T_3}{d} + \frac{T_6}{e} + \frac{T_9}{f}\right]$$

$$\gamma_8 = \frac{-(x_2x_3)}{a}\left[\frac{T_1}{d}(y_2 + y_3) + \frac{T_4}{e}(y_1 + y_3) + \frac{T_7}{f}(y_1 + y_2)\right] - \frac{(x_1x_3)}{b}\left[\frac{T_2}{d}(y_2 + y_3) + \right.$$

$$\left. \frac{T_5}{e}(y_1 + y_3) + \frac{T_8}{f}(y_1 + y_2)\right] - \frac{(x_1x_2)}{c}\left[\frac{T_3}{d}(y_2 + y_3) + \frac{T_6}{e}(y_1 + y_3) + \frac{T_9}{f}(y_1 + y_2)\right]$$

$$\gamma_9 = \frac{(x_2x_3)}{a}\left[\frac{T_1}{d}(y_2y_3) + \frac{T_4}{e}(y_1y_3) + \frac{T_7}{f}(y_1y_2)\right] + \frac{(x_1x_3)}{b}\left[\frac{T_2}{d}(y_2y_3) + \frac{T_5}{e}(y_1y_3) + \right.$$

$$\left. \frac{T_8}{f}(y_1y_2)\right] + \frac{(x_1x_2)}{c}\left[\frac{T_3}{d}(y_2y_3) + \frac{T_6}{e}(y_1y_3) + \frac{T_9}{f}(y_1y_2)\right]$$

Figure 7:
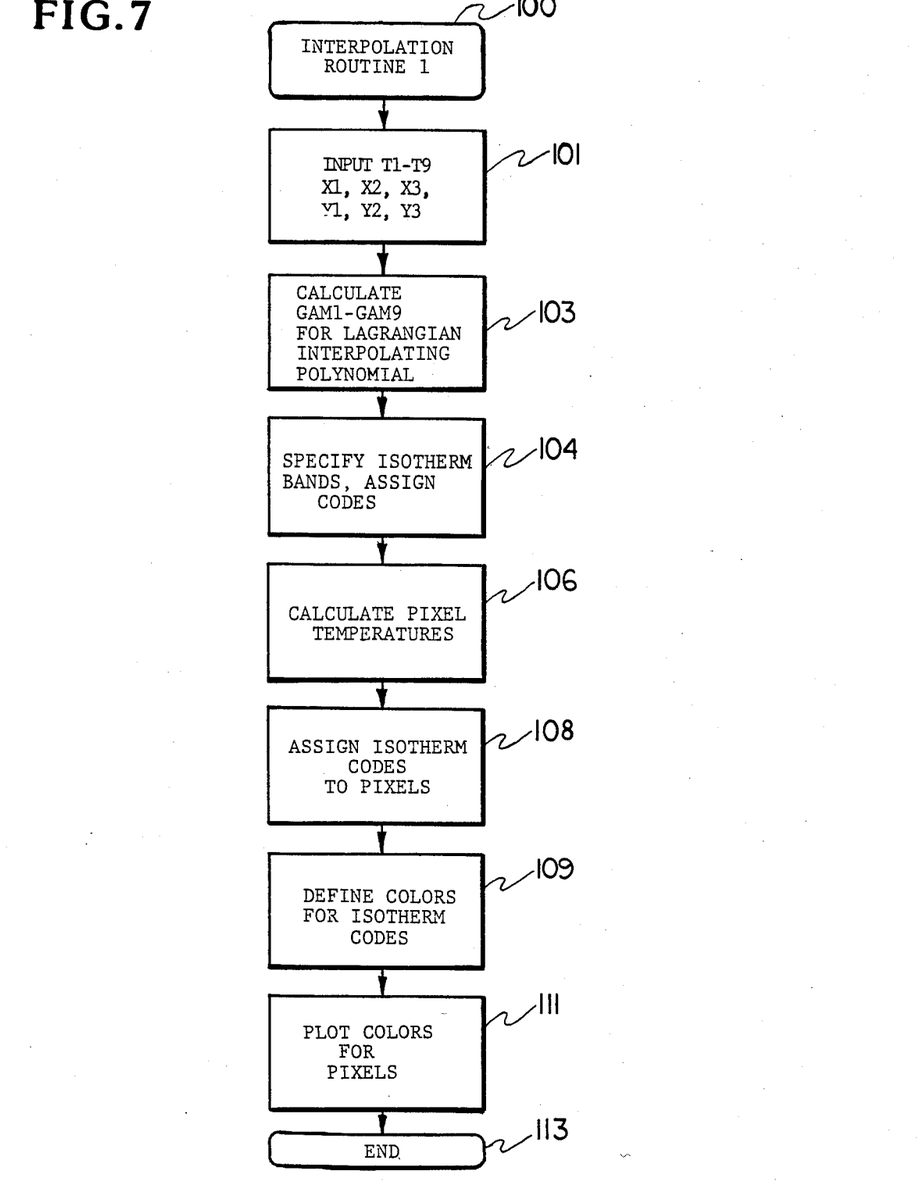
FIG. 7 is a flow chart schematic diagram of an interpolating routine according to a preferred embodiment of the invention.

In the above equations, the constants a, b, c, d, e, and f represent the formulas:

EQUATIONS III $a = (x_1 - x_2)(x_1 - x_3)$     $d = (y_1 - y_2)(y_1 - y_3)$
$b = (x_2 - x_2)(x_2 - x_3)$     $e = (y_2 - y_1)(y_2 - y_3)$
$c = (x_3 - x_1)(x_3 - x_2)$     $f = (y_3 - y_1)(y_3 - y_2)$ Pixel by Pixel Technique FIG. 7 is a block schematic diagram of a preferred routine for deriving interpolated grid temperatures on a point-by-point basis. Each point, or pixel, is assigned a coded value which is interpreted by the program to display or print a point of preassigned color (or in a black and white display, either black or white). At step 101, the CPU receives the coordinates of nine temperature sensor locations along with the temperature measured at each location. At 103, the program calculates GAM1-GAM9 for the Lagrangian interpolating polynomials, according to equations II given above. At 104, the program assigns a code number to each of the isotherm bands. Advantageously, such isotherm bands are established by the user in accordance with the minimum and maximum temperatures of the forehearth cross-section. At 106, the program specifies each pixel by its x and y coordinates and computes the temperature of such pixel using the Lagrangian interpolating polynomial, Equation I, above. At 108, each pixel is assigned the code given to the appropriate isotherm band at step 104. Then, at 109, the color pattern of each isotherm band is defined and the color of each pixel is drawn accordingly.

Figure 8:
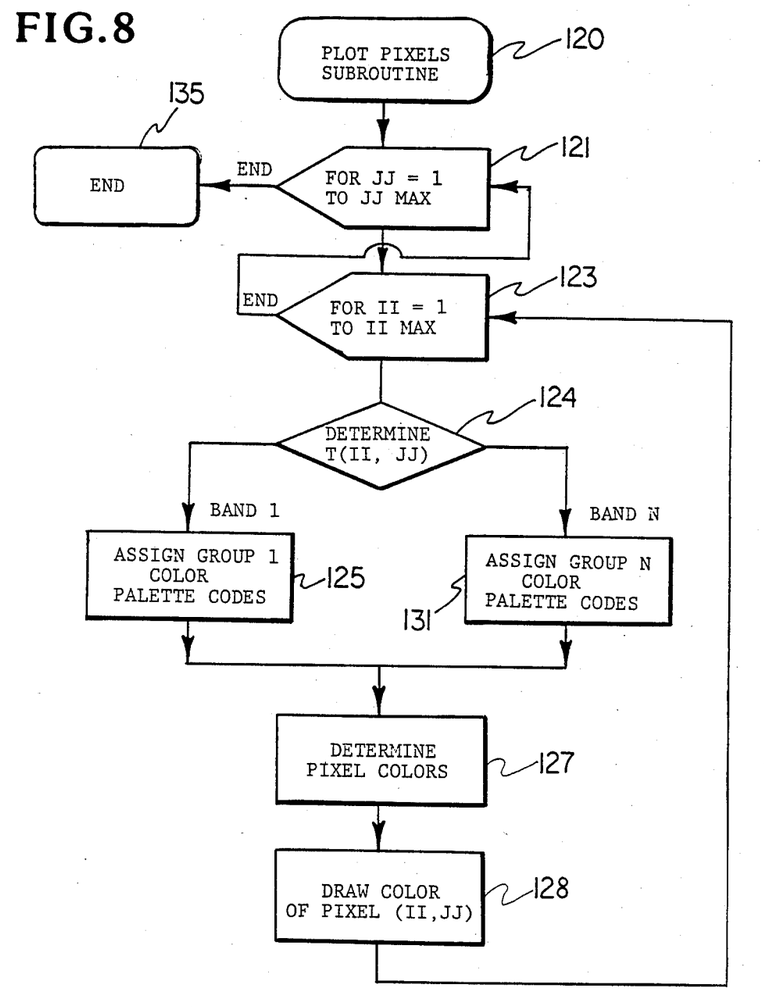
FIG. 8 is a flow chart schematic diagram of a color plotting subroutine within the main routine of FIG. 7.

FIG. 8 is a block schematic diagram showing a preferred subroutine 120 for plotting colors in the interpolation routine of FIG. 7 (i.e., step 109). This subroutine iterates through nested loops including each of the x-axis coordinates II and y-axis coordinates JJ, thereby providing a pixel-by-pixel color plot. At 124 the program determines the appropriate isotherm band of T(II,JJ)—i.e., the temperature calculated at 106 in the main routine of FIG. 7. The program then enters the branch appropriate to the determined isotherm band. Assuming Band 1, the program at 125 assigns a set of color pattern codes, each indicating a member of a color pattern set, to a contiguous group of pixels. This enables the creation of multicolored pixel arrays to extend the available ranges of hues beyond the basic palette colors. For example, using blocks of four pixels, the top-right and bottom-left pixels might be red, and the top-left and bottom-right pixels green, to create a brown composite effect. At 127 the program determines which color of the particular pattern the pixel should have, and at 128 the appropriate color is plotted based upon the determinations at steps 125 and 127.

Figures 4, 5:
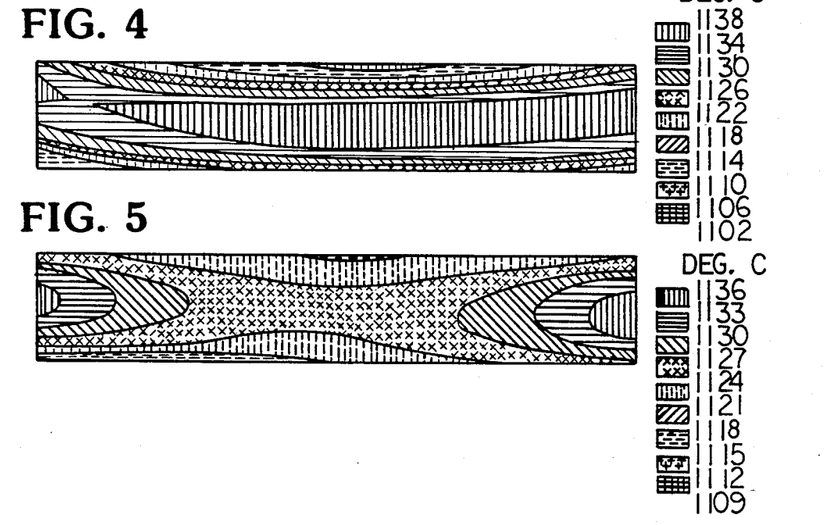
FIG. 4 is a display of a cross-section at the cooling zone exit, generated using the routine of FIGS. 7-8.
FIG. 5 is a display of a cross-section at the equalizing zone exit, generated using the routine of FIGS. 7-8.

FIGS. 3–5 show various displays generated using the interpolating routines of FIGS. 7, 8. FIG. 3 plots a temperature profile at the entrance to the forehearth, FIG. 4 at the exit of the cooling section, and FIG. 5 at the exit of the equalizing zone. Each display exhibits various isotherms with intermediate color-coded isotherm bands (in these views, characterized by different cross-hatchings). The temperature ranges associated with the various isotherm bands are identified in the legend at the right. These displays are limited in extent to the region intermediate the various sensors.

The interpolation scheme of FIGS. 7, 8 determines the interpolated temperature value for each pixel of the grid and provides pixel-by-pixel color assignments.

Banded Technique

Figure 9:
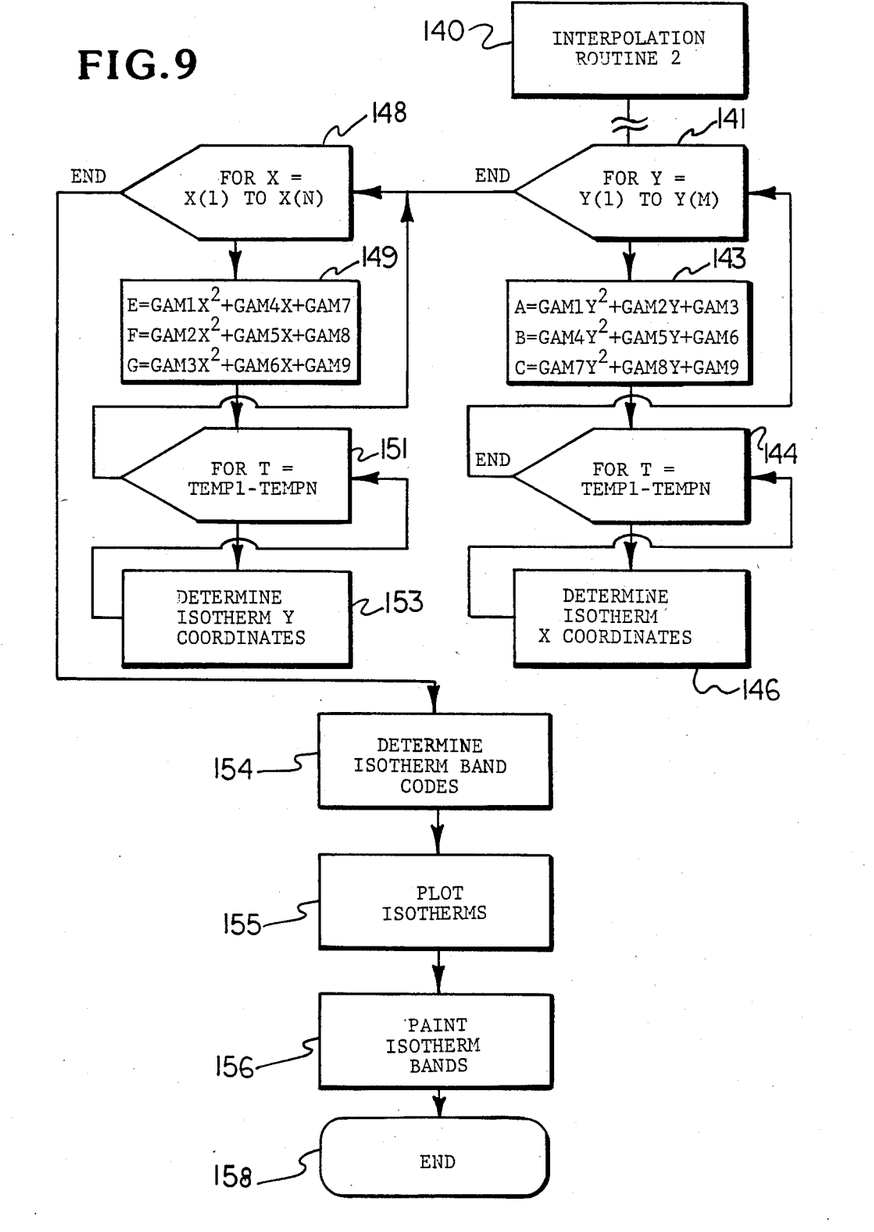
FIG. 9 is a flow chart schematic diagram of an interpolating routine according to an alternative embodiment of the invention.

An alternative interpolation routine in accordance with the present invention is shown in FIG. 9. In order to provide formulas for use in this alternative technique, the terms of Equation I can be reordered as follows:

$$T(x,y) = x^2(\gamma_1 y^2 + \gamma_2 y + \gamma_3) + x(\gamma_4 y^2 + \gamma_5 y + \gamma_6) + (\gamma_7 y^2 + \gamma_8 y + \gamma_9) \quad \text{EQUATION IV}$$

For convenience in the computer program implementation of the above calculation, $GAM1 = \gamma_1$, etc.

Equation I can also be rewritten as:

$$T(x,y) = y^2(\gamma_1 x^2 + \gamma_4 x + \gamma_7) + y(\gamma_2 x^2 + \gamma_5 x + \gamma_8) + (\gamma_3 x^2 + \gamma_6 x + \gamma_9) \quad \text{(Equation V)}$$

The routine of FIG. 9 includes initial steps identical to steps 103 and 104 of FIG. 7; these are omitted at the break of the flow chart diagram. This routine incorporates two principal loops (steps 141–146, 148–153, respectively) in which one of the coordinates is set at a known value, and the other coordinate of the various isotherms is determined by solving for the roots of the equation $Ax^2 + Bx + (C - T) = 0$, where A, B, and C represent the coefficients of Equation IV above. This solution, based upon the quadratic formula, may provide two, one or no roots. This is done while iterating through the y-axis coordinates of each pixel row of the grid, followed by iterating through the x-axis coordinates of each pixel column. That is, this routine searches for intercepts between each of the isotherms and the various x- and y-axes.

The operation of these loops may be illustrated by considering the loop comprising steps 141–146. For a given value of y determined at 141, the variables A, B, and C are determined at 143. The program then determines, for each designated isotherm TEMP1 to TEMPN, the x-coordinates having a corresponding interpolated temperature value. For each iteration of the outer loop 141–146, this routine will yield a set of x coordinates for each of the isotherms. The second loop 148–153 is required to assure a complete stepwise plotting of each of the isotherms along both the x-axis and y-axis.

Figure 6:
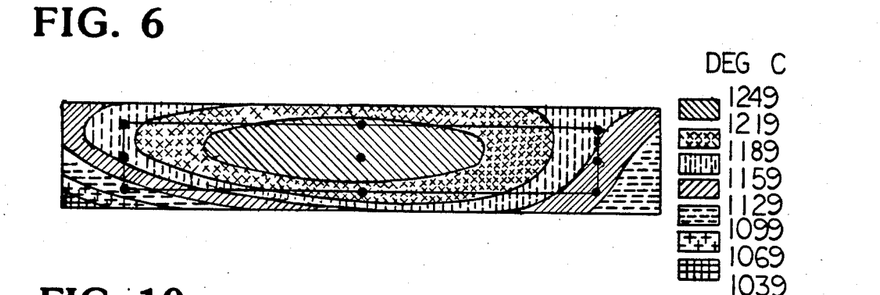
FIG. 6 is a display of a cross-section at the forehearth entrance, generated using the alternative routine of FIG. 9.

After the isotherm coordinates have been thus determined, appropriate codes are assigned to the isotherm bands according to the range of temperatures within such bands. Finally, the isotherms are plotted using the information compiled in the two loops, and the isotherm bands are solidly filled in with the palette color assigned at 156. FIG. 6 illustrates an isotherm display taken at the forehearth entrance (i.e., thermocouples 21–23 in FIG. 2A), generated using the technique of FIG. 9. Note that this version extrapolates beyond the 3×3 grid of sensor locations, using the same Lagrangian polynomials discussed above.

Figure 10:
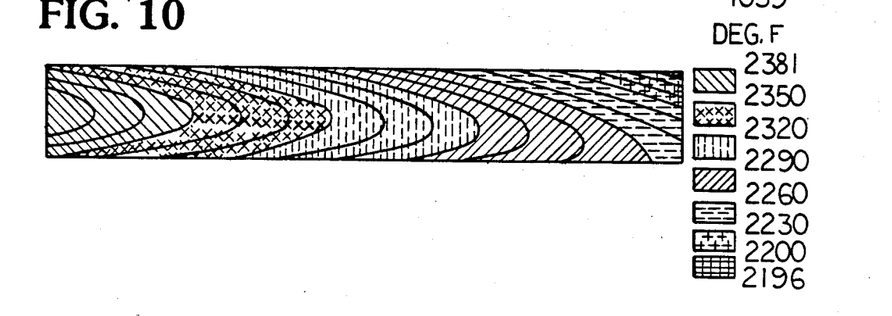
FIG. 10 is a display of a side-view cross-section, taken at the center of the forehearth channel.
Figure 11:
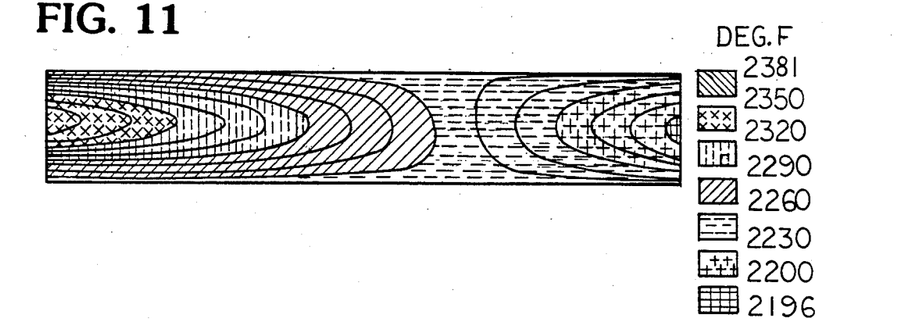
FIG. 11 is a display of a top-view forehearth cross-section, taken near the surface of the molten glass.

The interpolation technique of the invention may be easily applied not only to transverse cross-sections of the forehearth channel, as illustrated above, but also to top-view and side-view cross-sections. FIG. 10 gives a side-view display taken at a center plane of the forehearth channel (the plane of sensors 22, 28 in FIG. 2A). The left-hand side of the display represents the upstream end, and the right-hand side the downstream end. This display clearly shows a top-cooling effect causing a gradual skewing of the isotherms. FIG. 11 gives a top-view display of a horizontal plane near the surface of the molten glass; again, the glass flows from left to right. The assymmetry at the upstream end is due to the placement of the furnace, which causes the glass to be cooler at the bottom of the display which represents a region more remote from the furnace.

The technique of the invention may be broadened to three-dimensional interpolation by using the readings from a three-dimensional array of temperature sensors as inputs to the following equation:

Equation VI $$T(x,y,z) = \frac{(z - z_2)(z - z_3)}{(z_1 - z_2)(z_1 - z_3)} \left( \frac{(y - y_2)(y - y_3)}{(y_1 - y_2)(y_1 - y_3)} \left[ T_1 \frac{(x - x_2)(x - x_3)}{(x_1 - x_2)(x_1 - x_3)} + T_2 \frac{(x - x_1)(x - x_3)}{(x_2 - x_1)(x_2 - x_3)} + T_3 \frac{(x - x_1)(x - x_2)}{(x_3 - x_1)(x_3 - x_2)} \right] + $$

-continued $$\frac{(y-y_1)(y-y_3)}{(y_2-y_1)(y_2-y_3)}\left[T_4\frac{(x-x_2)(x-x_3)}{(x_1-x_2)(x_1-x_3)}+T_5\frac{(x-x_1)(x-x_3)}{(x_2-x_1)(x_2-x_3)}+T_6\frac{(x-x_1)(x-x_2)}{(x_3-x_1)(x_3-x_2)}\right]+$$

$$\frac{(y-y_1)(y-y_2)}{(y_3-y_1)(y_3-y_2)}\left[T_7\frac{(x-x_2)(x-x_3)}{(x_1-x_2)(x_1-x_3)}+T_8\frac{(x-x_1)(x-x_3)}{(x_2-x_1)(x_2-x_3)}+T_9\frac{(x-x_1)(x-x_2)}{(x_3-x_1)(x_3-x_2)}\right]\bigg)+$$

$$\frac{(z-z_1)(z-z_3)}{(z_2-z_1)(z_2-z_3)}\bigg(\frac{(y-y_2)(y-y_3)}{(y_1-y_2)(y_1-y_3)}\left[T_{10}\frac{(x-x_2)(x-x_3)}{(x_1-x_2)(x_1-x_3)}+T_{11}\frac{(x-x_1)(x-x_3)}{(x_2-x_1)(x_2-x_3)}+T_{12}\frac{(x-x_1)(x-x_2)}{(x_3-x_1)(x_3-x_2)}\right]+$$

$$\frac{(y-y_1)(y-y_3)}{(y_2-y_1)(y_2-y_3)}\left[T_{13}\frac{(x-x_2)(x-x_3)}{(x_1-x_2)(x_1-x_3)}+T_{14}\frac{(x-x_1)(x-x_3)}{(x_2-x_1)(x_2-x_3)}+T_{15}\frac{(x-x_1)(x-x_2)}{(x_3-x_1)(x_3-x_2)}\right]+$$

$$\frac{(y-y_1)(y-y_2)}{(y_3-y_1)(y_3-y_2)}\left[T_{16}\frac{(x-x_2)(x-x_3)}{(x_1-x_2)(x_1-x_3)}+T_{17}\frac{(x-x_1)(x-x_3)}{(x_2-x_1)(x_2-x_3)}+T_{18}\frac{(x-x_1)(x-x_2)}{(x_3-x_1)(x_3-x_2)}\right]\bigg)+$$

$$\frac{(z-z_1)(z-z_2)}{(z_3-z_1)(z_3-z_2)}\bigg(\frac{(y-y_2)(y-y_3)}{(y_1-y_2)(y_1-y_3)}\left[T_{19}\frac{(x-x_2)(x-x_3)}{(x_1-x_2)(x_1-x_3)}+T_{20}\frac{(x-x_1)(x-x_3)}{(x_2-x_1)(x_2-x_3)}+T_{21}\frac{(x-x_1)(x-x_2)}{(x_3-x_1)(x_3-x_2)}\right]+$$

$$\frac{(y-y_1)(y-y_3)}{(y_2-y_1)(y_2-y_3)}\left[T_{22}\frac{(x-x_2)(x-x_3)}{(x_1-x_2)(x_1-x_3)}+T_{23}\frac{(x-x_1)(x-x_3)}{(x_2-x_1)(x_2-x_3)}+T_{24}\frac{(x-x_1)(x-x_2)}{(x_3-x_1)(x_3-x_2)}\right]+$$

$$\frac{(y-y_1)(y-y_2)}{(y_3-y_1)(y_3-y_2)}\left[T_{25}\frac{(x-x_2)(x-x_3)}{(x_1-x_2)(x_1-x_3)}+T_{26}\frac{(x-x_1)(x-x_3)}{(x_2-x_1)(x_2-x_3)}+T_{27}\frac{(x-x_1)(x-x_2)}{(x_3-x_1)(x_3-x_2)}\right]\bigg)\bigg)$$

In the above Lagrangian equations, with reference to FIGS. 1 and 2B, the subscripted x, y, and z parameters correspond to the various x-axis, y-axis, and z-axis coordinates of a $3\times3\times3$ array of temperature sensors, while $T_1$–$T_{27}$ are the temperature readings from these sensors. This equation may be rewritten in the form:

$$T(x,y,z) = z^2[y^2(0_1x^2 + 0_2x + 0_3) +$$
$$y(0_4x^2 + 0_5x + 0_6) + (0_7x^2 + 0_8x + 0_9)] +$$
$$z[y^2(0_{10}x^2 + 0_{11}x + 0_{12}) +$$
$$y(0_{13}x^2 + 0_{14}x + 0_{15}) +$$
$$(0_{16}x^2 + 0_{17}x + 0_{18})] +$$
$$[y^2(0_{19}x^2 + 0_{20}x + 0_{21}) +$$
$$y(0_{22}x^2 + 0_{23}x + 0_{24}) +$$
$$(0_{25}x^2 + 0_{26}x + 0_{27})]$$

Equations VII where $\phi_1$, $\phi_2$, etc. are expressions of $T_1$–$T_{27}$, $x_1$, $x_2$, $x_3$, $y_1$, $y_2$, $y_3$, $z_1$, $z_2$, and $z_3$.

Thus, the interpolated temperature value of any point in the channel volume under analysis may be obtained from Equation VII, using routines analogous those of FIGS. 7, 8 or that of FIG. 9. This enables the calculation of interpolated temperatures not only within a plane of sensors, but also in planes containing no sensor location points. With further reference to FIG. 2B, one may use this technique to derive interpolated temperatures at an x-y plane of the forehearth at axial location $z_4$, at which there are no sensors. This may be used for example in a temperature control system to provide independent control of heating devices at locations intermediate the thermocouple arrays, whereas in the prior art a plurality of heating devices were typically commonly controlled in a P.I.D. loop based upon the readings from a single set of temperature sensors.

Although the above discussion has presumed $3\times3$ or $3\times3\times3$ arrays of temperature sensors, which result in second-degree Lagrangian polynomials, the invention encompasses $m\times n$ or $m\times n\times p$ arrays of temperature sensors. A $3\times4$ array of sensors will lead to second-degree polynomial expressions in x and third degree polynomial expressions in y (more generally, for each axis the degree of the polynomial will be one less than the number of sensors).

Although the preferred interpolation technique uses Lagrangian polynomials, other multivariate interpolating functions may be employed, such as cubic splines.

While reference has been made above to a specific embodiment, it will be apparent to those skilled in the art that various modifications and alterations may be made thereto without departing from the spirit of the present invention. Therefore, it is intended that the scope of this invention be ascertained by reference to the following claims.

I claim:
1. Apparatus for displaying the temperature profile of molten glass at cross sections of a forehearth channel in a forehearth temperature monitoring system, comprising:
   a plurality of essentially planar arrays of temperature sensors, wherein the forehearth channel is divided into at least one cooling zone and an equalizing zone, and wherein at least one essentially planar array is provided in said equalizing zone and in each cooling zone,
   means for receiving output signals from said sensors and for providing a plurality of digital temperature value signals having values based upon the temperatures sensed by said sensors, means for defining a grid of location points, said grid representing at least a portion of one of said forehearth cross-sections and said location points including the location points of said sensors, means for fitting an interpolating function to the digital temperature value signals for said sensor location points to define interpolated temperature values at the other location points of said grid, said interpolating function expressing temperature as a function of two-dimensional location coordinates, means for generating a plurality of isotherms each comprising a set of said location points having temperature values at or near prescribed temperature values, and means for displaying said isotherms in a display of said forehearth channel cross-sections.

2. Apparatus as defined in claim 1 wherein the interpolating function is a Lagrangian polynomial.

3. Apparatus as defined in claim 1 wherein the display means comprises a color monitor.

4. Apparatus as defined in claim 1 wherein the sensor location points form a rectangular matrix.

5. A method for displaying the temperature profile of molten glass at a cross section of a forehearth channel in a forehearth temperature monitoring system, such temperature monitoring system including at least one essentially planar array of temperature sensors, comprising the steps of providing a plurality of digital temperature value signals having values based upon the temperatures sensed by said sensors, defining a grid of location points, said grid representing at least a portion of said forehearth cross-section and said location points including the location points of said sensors, fitting an interpolating function to the digital temperature value signals for said sensor location points to define interpolated temperature values at the other location points of said grid, said interpolating function expressing temperature as a function of two-dimensional location coordinates, generating a plurality of isotherms each comprising a set of said location points having temperature values at or near prescribed temperature values, and displaying said isotherms in a display of said forehearth channel cross-section.

6. A method according to claim 5 wherein said interpolating function is a Lagrangian polynomial.

7. A method as defined in claim 6 wherein the fitting step comprises calculating the interpolated temperature value for every location point of the grid.

8. A method as defined in claim 5 wherein the fitting and generating steps are carried out on row-by-row and column-by-column basis for such grid, to derive any intercepts between the isotherms and each row and column.

9. A method as defined in claim 5 wherein the sensor location points form a rectangular matrix.

10. A method as defined in claim 5 wherein the display step comprises filling in isotherm bands intermediate the isotherms so that adjoining isotherm bands are visually distinguishable.

11. A method as defined in claim 10 wherein each of the isotherm bands is filled with color elements of a single hue.

12. A method as defined in claim 10 wherein each of the isotherm bands is filled with multiply-hued color elements.

13. A method as defined in claim 5 wherein the grid is bordered by the outermost sensor location points.

14. A method as defined in claim 5 wherein the grid extrapolates beyond the sensor location points.

15. A method as defined in claim 5 wherein the forehearth channel is divided into at least one cooling zone and an equalizing zone, and wherein at least one essentially planar array is provided in said equalizing zone and in each of said cooling zones.

16. A method for displaying the temperature profile of molten glass at cross sections of a forehearth channel in a forehearth temperature monitoring system, such temperature monitoring system including a plurality of parallel, essentially planar arrays of temperature sensors, comprising the steps of providing a plurality of digital temperature value signals having values based upon the temperatures sensed by said sensors, defining a three-dimensional matrix of location points, said matrix representing at least a portion of said forehearth channel and said location points including the location points of said sensors, fitting an interpolating function to the digital temperature value signals for said sensor location points to define interpolated temperature values at least some of the other location points of said matrix, said interpolating function expressing temperature as a function of three-dimensional location coordinates, generating a plurality of isotherms within a given cross-section of the channel each isotherm comprising a set of said location points having temperature values at or near prescribed temperature values, and displaying said isotherms in a display of said forehearth channel cross-section.

17. A method as defined in claim 16 wherein the interpolating function is a Lagrangian polynomial.

18. A method as defined in claim 16, wherein the forehearth channel is divided into at least one cooling zone and an equalizing zone, and wherein at least one of said parallel, essentially planar arrays is located in said equalizing zone and in each cooling zone.

* * * * *